UNITED STATES PATENT OFFICE.

JOSEPH WILLIAM TAYLOR, OF PATERSON, NEW JERSEY.

PLASTIC COMPOSITION.

1,119,550.  Specification of Letters Patent.  Patented Dec. 1, 1914.

No Drawing.  Application filed March 31, 1913. Serial No. 757,895.

*To all whom it may concern:*

Be it known that I, JOSEPH WILLIAM TAYLOR, a citizen of the United States, and resident of Paterson, in the county of Passaic and State of New Jersey, have invented a new and useful Improvement in Plastic Compositions, of which the following is a specification.

The object of my invention is to provide a novel composition of matter which will be particularly well adapted for use as a flooring, curbing, slabbing and the like, which composition may be readily laid down in its plastic state.

My improved plastic composition is prepared from the following materials, calcined magnesite, chlorid of magnesium, phosphorous acid, woodflour, olein, blowed linseed oil, and a suitable coloring matter.

The plastic composition is prepared in the following manner: A dry mixture is made of calcined magnesite 71 parts, woodflour 20 parts and coloring matter 9 parts. This dry mixture is then dampened with a solution of chlorid of magnesium 21°, (Baumé hydrometer), to a degree sufficient to bring the dry mixture to a plastic state. To each two and one-half gallons of this chlorid of magnesium solution, there is mixed one-half ounce of the solution of 200 grains of the composition of olein, blowed linseed oil and phosphorous acid (1.700 specific gravity) diluted down with water to 30° (Baumé hydrometer). This plastic composition is then ready to be laid down. In this plastic composition the woodflour (finely pulverized sawdust) gives elasticity to the final product and also makes the same extremely light in weight and noiseless to a considerable extent. The olein and the blowed linseed oil makes the final product pliable, while the blowed linseed oil also serves to hold the color and adds to the elasticity of the mass and assists in the proper amalgamation of the elements. The phosphorous acid also acts to cement the several elements of the mass.

The composition prepared from the elements above enumerated in substantially the proportions set forth is very light, pliable and elastic and is extremely durable and presents a smooth wearing surface.

What I claim is:

1. A plastic composition prepared from the following materials: calcined magnesite, chlorid of magnesium, phosphorous acid, woodflour, olein, blowed linseed oil and a suitable coloring matter, combined in the proportions substantially as herein set forth.

2. The method of producing a plastic composition from calcined magnesite, chlorid of magnesium, phosphorous acid, woodflour, olein, blowed linseed oil and a suitable coloring matter, consisting in dampening with chlorid of magnesium solution a dry mixture of calcined magnesite, woodflour and coloring matter and adding thereto a solution of the composition of olein, blowed linseed oil and phosphorous acid, the several elements being in proportions substantially as herein set forth.

In testimony, that I claim the foregoing as my invention, I have signed my name in presence of two witnesses, this twenty-fifth day of March 1913.

JOSEPH WILLIAM TAYLOR.

Witnesses:
F. GEORGE BARRY,
C. S. SUNDGREN.